United States Patent [19]

Bockstiegel

[11] 4,019,239
[45] Apr. 26, 1977

[54] METHOD OF PRODUCING MAGNETITE ARTICLE

[75] Inventor: Georg Heinrich Artur Gerhard Bockstiegel, Hoganas, Sweden

[73] Assignee: Hoganas Aktiebolag, Hoganas, Sweden

[22] Filed: Sept. 11, 1974

[21] Appl. No.: 504,881

[30] Foreign Application Priority Data

Sept. 26, 1973 Sweden .............................. 7313077

[52] U.S. Cl. ................................. 29/592; 75/226; 264/111
[51] Int. Cl.² .......................................... H01S 4/00
[58] Field of Search ............... 29/630 C, 592, 420, 29/420.5, 608, 615; 423/633; 75/.5 BA, 200, 206, 211, 214, 221, 226; 264/109, 111, 125, 126, 61, 62, 64, 66, 56, 104, 120; 204/292, 293, 196, 197, 147, 148; 252/519, 52.56; 200/262, 265, 266, 270; 148/105, 120, 121, 122, 12, 12.1, 15, 126, 131, 154; 72/354, 359, 342

[56] References Cited

UNITED STATES PATENTS

| 914,891 | 3/1909 | Steinmetz | 423/633 X |
|---|---|---|---|
| 2,503,947 | 4/1950 | Haskew | 264/11 X |
| 3,231,648 | 1/1966 | Eyre et al. | 264/111 |
| 3,410,683 | 11/1968 | Zapf | 75/226 X |
| 3,739,445 | 6/1973 | Gabriel | 75/226 X |
| 3,795,129 | 3/1974 | Goto | 29/420.5 |

*Primary Examiner* — James R. Duzan
*Attorney, Agent, or Firm* — Toren, McGeady and Stanger

[57] ABSTRACT

Magnetite, $Fe_3O_4$, can be transformed into articles having a high electrical conductivity by heating magnetite powder to a temperature of 900° – 1300° C and compacting said heated powder to form an article having a porosity below 3% by volume.

4 Claims, No Drawings

METHOD OF PRODUCING MAGNETITE ARTICLE

The invention relates to a magnetite article having a high electrical conductivity, and to a method of manufacturing such an article. The invention particularly relates to a magnetite article to be used as an electrode.

At present magnetite electrodes in the form of plates, rods or tubes (with or without bottom) are used in the electrolytic corrosion protection of ships and underwater constructions of iron and steel, and also in the electrochemical industry. These electrodes are produced by casting of hematite (purple ore $Fe_2O_3$) which is reduced into magnetite ($Fe_3O_4$).

This type of cast electrodes has a number of disadvantages, primarily high manufacturing costs and low electrical conductivity (considerably lower than that of pure magnetite). In order to improve the electrical contact between the magnetite electrode and the current supplying cables or wires and to decrease the electric potential drop in the electrode certain parts thereof are often copper plated.

To obtain magnetite electrodes with electrical conductivity properties comparative to those of the pure magnetite a suitable manufacturing technique has been sought. It has been tried to cast molten magnetite, but in order to avoid cracking in the casting, the cooling has to take place so slowly that this method turns out to be impractical.

To avoid this disadvantage attempts at slow cooling by compacting magnetite powder have been tried to obtain an electrode with good conductivity. However, it turns out that also this method of manufacturing results in a product with low electrical conductivity even if the product is sintered after compacting.

This invention pertains to magnetite electrodes with considerably improved electrical conductivity and to a method for the production of such electrodes. The basis of the invention is a method of hot pressing of a preform made from magnetite powder. This method has turned out to give a dense magnetite material with very high electrical conductivity. Therefore, the copper plating mentioned above can be dispensed with insofar as the conductivity is concerned although the copper may be useful for other reasons.

It is a particular object of the invention to provide a magnetite electrode having a porosity below 3%, preferably below 1% by volume.

The first step of the method of manufacturing consists in producing a preform of magnetite powder. These preforms can consist in cold compacted blanks of magnetite powder to which it can be advantageous to add a temporary binder, or sheet-metal cans filled with magnetite powder. These cans can be open or sealed. If sealed cans are used, they must be evacuated in order not to be deformed during the subsequent heating.

The preform thus produced is then heated to a temperature between 900° and 1300° C, preferably between 1000° and 1150° C. The preform is then pressed at this temperature to obtain a dense structure. This hot pressing can take place for instance through isostatic pressing or in a pressing tool.

When the hot pressing is carried out in a tool, this has a considerably lower temperature than the preform. The tool temperature is below 500°C.

If a further increase of the electrical conductivity is wanted or if required with respect to the positioning of electrical cables or wires, copper sheets can be adapted on suitable places on the magnetite body through the following procedure.

When the preform consists of cold compacted magnetite powder a thin copper sheet is located either in the hot pressing tool before the heated precompacted magnetite body is introduced into this tool or on top of or around the magnetite preform itself before or immediately after its heating up. During the hot pressing the copper sheet adheres as a dense copper layer on the magnetite body. If the preform consists of a sheet metal can filled with magnetite powder, this can be made of copper in cases where a copper layer on the electrode is desired.

Below are examples for carrying out the invention:

EXAMPLE 1

Magnetite powder with a particle size less than 30 microns with an addition of the temporary binder dextrin was compacted to rod shaped preforms in a compacting tool of that type which is used in the ceramic and powder metallurgy industry. The preforms thus obtained (having a porosity of 35%) were heated in air to a temperature of 1150° C and were pressed at this temperature and a pressure of 600 MPa (megapascal, 1Pa being 1 Newton per square meter) in a pressing tool similar to the one used in the cold compacting of the powder.

This procedure resulted in a dense magnetite body with very high electric conductivity.

EXAMPLE 2

Magnetite powder was filled in a container of iron sheet which, after evacuating the air was sealed gas tightly. This preform (having a porosity of 35%) was introduced into an autoclave for isostatic hot pressing, i.e., a heatable gas-filled high pressure vessel where it was subjected to a temperature of 1150° C and a simultaneous gas pressure of 100 MPa.

This procedure resulted in a dense magnetite body covered with a closely adhering coating of iron.

This metal layer by which the electrode is coated when applying a procedure similar to that in Example 2 can either be left on the magnetite body or removed by chemical (dissolving), thermal (fusing) or mechanical means.

Compared to the magnetite electrodes at present used, the new electrodes manufactured according to this invention have many advantages. The main advantage it the higher electrical conductivity. Other advantages are: lower manufacturing costs, improved possibilities of shaping and dimensional control, saving of the copper coating in certain cases of application.

What is claimed is:

1. A method of manufacturing a magnetite article having a high electrical conductivity, comprising compacting magnetite powder to form a preform, heating said preform at 900° – 1300° C and hot compacting the heated preform at a pressure of 100 to 600 Megapascal in a compacting tool having a temperature below 500° C until a dense magnetite article is produced.

2. The method of claim 1 in which the preform consists of a sheet metal can filled with magnetite powder, and in which the hot pressing of the preform is carried out in a pressing tool.

3. A method as claimed in claim 1, comprising mixing the magnetite powder with a temporary binding agent, and cold compacting said mixture to produce a preform, and hot compacting said preform.

4. The method of claim 1 wherein the powder, after hot compacting, has a porosity less than 3% by volume.

* * * * *